United States Patent [19]

Wilson

[11] Patent Number: 4,804,013

[45] Date of Patent: Feb. 14, 1989

[54] FLUID LINE DEICER

[76] Inventor: Donald W. Wilson, 3349 Amie East, Dade City, Fla. 33525

[21] Appl. No.: 109,588

[22] Filed: Oct. 19, 1987

[51] Int. Cl.$^4$ .............................................. B60T 17/18
[52] U.S. Cl. ...................................... 137/351; 138/34; 303/1
[58] Field of Search ............... 137/204, 351, 557, 558; 303/1; 138/34, 35

[56] References Cited

U.S. PATENT DOCUMENTS

| | | | |
|---|---|---|---|
| 337,408 | 3/1886 | Kearns | 138/34 |
| 516,251 | 3/1894 | Werlé | 137/557 |
| 1,336,905 | 4/1920 | Hunzicker | 138/34 |
| 2,330,413 | 9/1943 | Eaton | 303/1 |
| 2,670,130 | 2/1954 | Bloxsom | 138/34 X |
| 2,761,529 | 9/1956 | Wisenbaugh | 301/1 X |
| 2,828,772 | 4/1958 | Landis | 138/34 |
| 2,989,978 | 6/1961 | Gresko | 137/204 |

*Primary Examiner*—Stephen Hepperle
*Attorney, Agent, or Firm*—Jerry T. Kearns

[57] ABSTRACT

A fluid line deicer specifically designed for use on air brake lines of a tractor trailer includes an alcohol storage tank provided with fittings for engagement between the tractor air supply line and the trailer brake lines. The alcohol storage tank may be provided with a pressure gage for monitoring pressure in the system and a sight glass for monitoring the alcohol level of the tank. In use, when operating in cold conditions where brake line freeze up is encountered, alcohol is added through a screw on cap to the alcohol tank so that it may be introduced into the brake lines. The alcohol absorbs any moisture and thaws any ice deposits in the brake lines and prevents ice up.

1 Claim, 2 Drawing Sheets

FLUID LINE DEICER

BACKGROUND OF THE INVENTION

1. Field of the Invention

The present invention relates to fluid line deicers, and more particularly pertains to a new and improved brake line deicer for use on air brake lines of a tractor trailer. All tractors and trailers using air brakes can and will collect moisture in the air system. This will result in complete loss of brakes caused by freezing of the accumulated moisture during the winter months. The moisture which has accumulated in the lines will freeze causing the brakes to lock up. This creates a dangerous condition as well as costing the vehicle operator valuable down time in thawing the brake lines. An effective measure against this problem is to add alcohol or other anti-freeze liquids that will disperse ice and water. Alcohol is preferred due to its low cost and wide availability. The current practice for an operator encountering brake line freeze up is to disconnect the air line where it connects to the trailer, stand up between the tractor and trailer with one foot on each of the chassis rails, hold the air line overhead in one hand and pour alcohol into the air fitting with the other hand. The hole in the air fitting is small in diameter and it is a difficult task to pour the alcohol into the hole during inclement weather conditions. This operation is inconvenient as well as potentially dangerous to the operator, who is apt to slip and fall. In order to overcome these difficulties, the present invention provides an in line alcohol tank to which alcohol may be added to disperse ice and water within the brake lines. Alcohol may be added to the system without disconnecting the brake lines by merely removing a screw on top of the alcohol tank.

2. Description of the Prior Art

Various types of fluid line deicers are known in the prior art. A typical example of such a fluid line deicer is to be found in U.S. Pat. No. 1,105,040, which issued to C. Paulus on July 28, 1914. This patent discloses the use of an electrical coil surrounding a fire plug to prevent freeze up. U.S. Pat. No. 3,446,278, which issued to E. Heinrich on May 27, 1969, discloses a nonfreezing fluid connection which utilizes a fluid heat exchanger to prevent freeze up of a water line. U.S. Pat. No. 4,321,908, which issued to R. Reed on Mar. 30, 1982, discloses a fluid line connection for preventing freeze damage to liquid conduits. The device utilizes an interior conduit which is provided with an expansion joint to accommodate an axial change in dimension during freeze up.

While the above mentioned devices are suited for their intended usage, none of these devices provide an alcohol dispensing tank which may be connected between a tractor and trailer to prevent freeze up of the air brake lines. Further, none of the aforesaid prior art devices provide an alcohol dispensing tank with fittings for the in line connection in the air brake supply line of a tractor trailer. An additional feature of the present invention not contemplated by the previously described prior art devices is the provision of an alcohol tank for the in line connection in the air supply brake line of a tractor trailer which is provided with a sight glass for determining the alcohol level in the tank and a pressure gage for monitoring the pressure in the system. Inasmuch as the art is relatively crowded with respect to these various types of fluid line deicers, it can be appreciated that there is a continuing need for and interest in improvements to such fluid line deicers, and in this respect, the present invention addresses this need and interest.

SUMMARY OF THE INVENTION

In view of the foregoing disadvantages inherent in the known types of fluid line deicers now present in the prior art, the present invention provides an improved fluid line deicer. As such, the general purpose of the present invention, which will be described subsequently in greater detail, is to provide a new and improved fluid line deicer which has all the advantages of the prior art fluid line deicers and none of the disadvantages.

To attain this, a representative embodiment of the concepts of the present invention is illustrated in the drawings and makes use of an alcohol tank provided with fittings for in line connection in the air supply brake line between a tractor and a trailer. The alcohol tank may be provided with a screw on lid, a sight glass for monitoring the level of alcohol in the tank and a pressure gage for monitoring the pressure in the system. During freezing conditions, water and ice which have accumulated in the brake lines will freeze causing the brakes to lock up. This condition may be alleviated by the present invention by merely adding alcohol to the alcohol tank. Application of the brakes will then distribute the alcohol throughout the brake system, thus thawing and removing any accumulated ice deposits.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fluid line deicer which has all the advantages of the prior art fluid line deicers and none of the disadvantages.

It is another object of the present invention to provide a new and improved fluid line deicer which may be easily and efficiently manufactured and marketed.

It is a further object of the present invention to provide a new and improved fluid line deicer which is of a durable and reliable construction.

An even further object of the present invention is to provide a new and improved fluid line deicer which is susceptible of a low cost of manufacture with regard to both materials and labor, and which accordingly is then susceptible of low prices of sale to the consuming public, thereby making such fluid line deicers economically available to the buying public.

Still yet another object of the present invention is to provide a new and improved fluid line deicer which provides in the apparatuses and methods of the prior art some of the advantages thereof, while simultaneously overcoming some of the disadvantages normally associated therewith.

Still another object of the present invention is to provide a new and improved fluid line deicer for connection in the air supply line between a tractor and a trailer for deicing the brake lines.

Yet another object of the present invention is to provide a new and improved fluid line deicer for connection in the air brake supply line between the tractor and trailer which includes an alcohol tank for dispensing alcohol through the brake system.

Even still another object of the present invention is to provide a new and improved fluid line deicer for in line connection in the air brake supply line between a tractor and trailer which may be used to introduce alcohol into the brake system without the necessity of disconnecting any of the brake lines.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
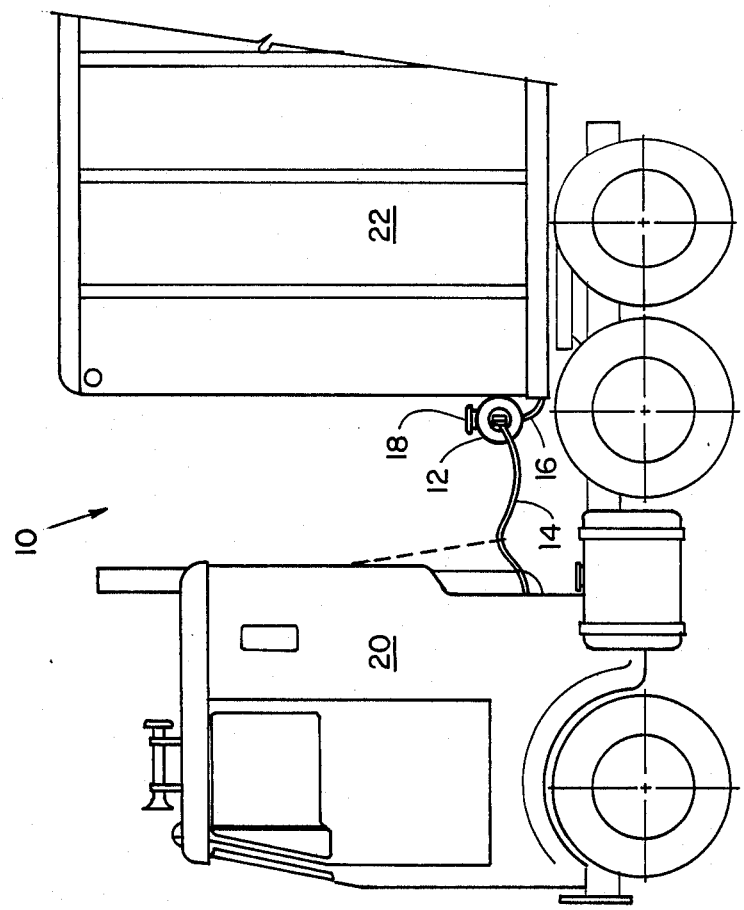
FIG. 1 is a perspective view of a tractor trailer having the deicer of the present invention connected in the air brake supply line between the tractor and trailer.

With reference now to the drawings, and in particular to FIG. 1 thereof, a new and improved fluid line deicer embodying the principles and concepts of the present invention and generally designated by the reference numeral 10 will be described.

More specifically, it will be noted that the first embodiment 10 of the invention includes an alcohol supply tank 12 connected between the air brake supply line 14 of a tractor 20 and the trailer brake air supply line 16 of the trailer 22. The alcohol supply tank has a screw on cap 18 for the addition of alcohol to the tank when it, is desired to deice the trailer brake lines. The alcohol tank 18 is preferably mounted on the front side of the trailer 22; this may be achieved by conventional mounting brackets or straps.

Figure 2:
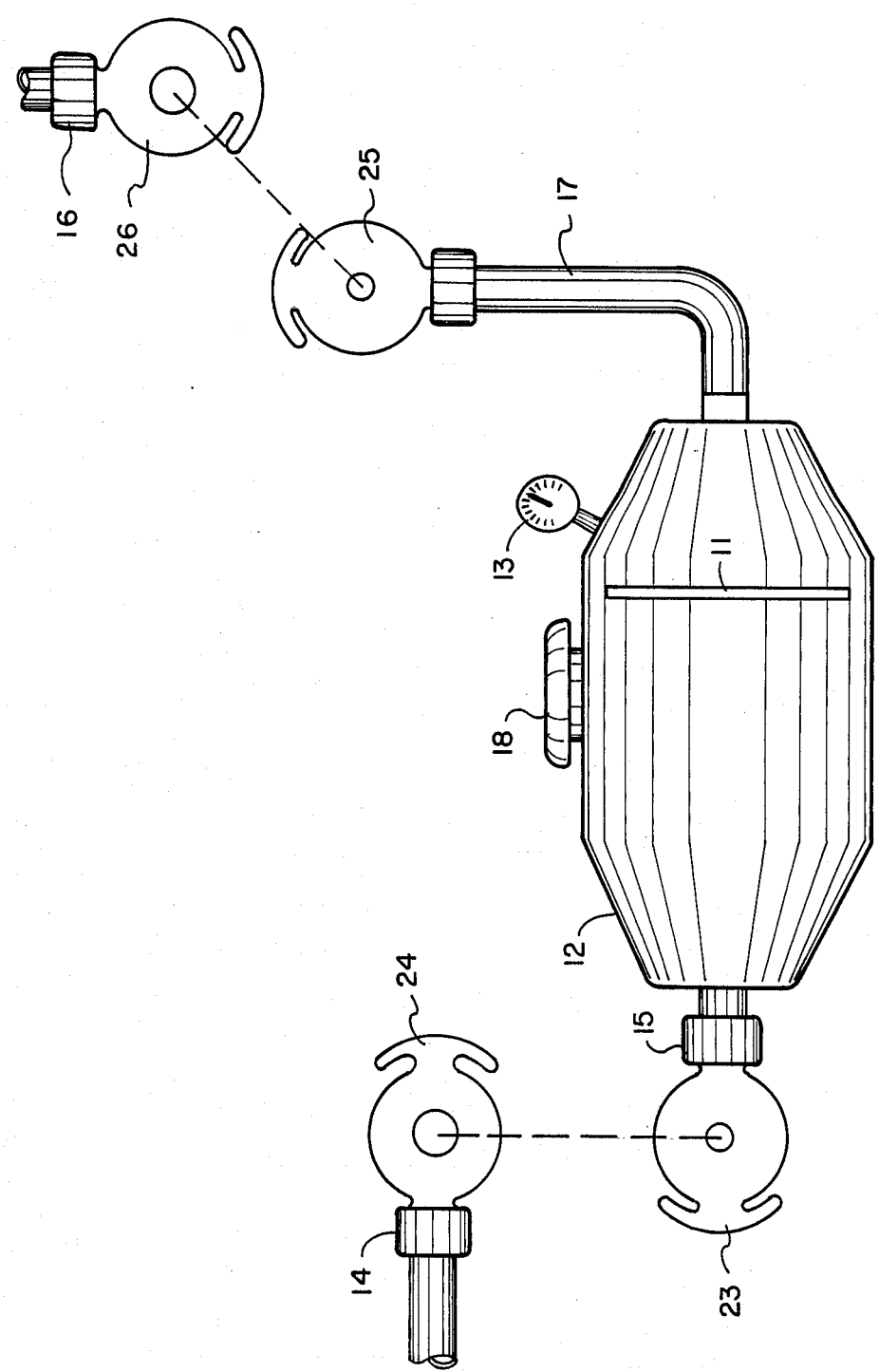
FIG. 2 is a diagrammatic view of the deicer system of the present invention.

With reference now to FIG. 2, it may be seen that the alcohol supply tank 12 may be filled with alcohol by removing the screw on cap 18. The level of alcohol in the tank 12 may be determined by observing a sight glass 11. A pressure gage 13 may be provided for monitoring pressure within the system. The alcohol supply tank 12 is preferably constructed from a high strength plastic or metal capable of withstanding at least one hundred and seventy psi. An inlet fitting 15 is provided with a conventional connector 23. This type of connector is known as a "glad hands" connector. The connector 23 is designed for mating engagement with a connector 24 on the air brake supply line 14 coming from the tractor 20. At the outlet side of the alcohol supply tank 12, a flexible tubing 17 is provided with another "glad hands" connector 25. This connector is adapted to mate with a similar connector 26 provided on the trailer air brake supply line 16. Thus it may seen that the alcohol supply tank 12 may be readily mounted on conventional existing brake lines due to the provision of the cooperating connectors 23 and 25. The flexible line 17 allows for some adjustability in positioning the alcohol tank 12. In use, the alcohol tank 12 is mounted on the front surface of the trailer 22 and is subject to the air pressure within the brake system.

With reference now to FIG. 1, the manner of operation of the fluid line deicer 10 of the present invention will now be described. When the vehicle operator encounters brake freeze up problems, he need merely remove the screw on cap 18 and add alcohol to the alcohol supply tank 12. It should be noted that other deicing fluids may be utilized in place of alcohol, although alcohol is preferred because of its low cost and wide availability. The operator then need merely actuate the trailer brakes to dispense the alcohol within the tank 12 under pressure into the trailer brake line 16. From there, the alcohol is distributed throughout the trailer brake system, thawing and removing any accumulated ice deposits. It should be noted that as a precautionary measure against brake line ice up, alcohol may be periodically added to the tank 12 during the winter months and distributed throughout the trailer brake system. This flushes away any accumulated moisture in the system and avoids the possibility of dangerous brake failure due to ice up.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In an air brake system of a tractor trailer having a compressed air supply line extending from a compressor and compressed air storage tank in the tractor and connected by "glad hands" connectors to an air brake distribution line in the trailer, the improvement comprising:

an alcohol storage tank having a hollow interior without baffles or other obstructions;

said storage tank having a cylindrical body portion with oppositely tapering first and second frustoconical ends, each of said ends having a circular end wall;

a volume of alcohol received within said tank;

said alcohol storage tank mounted on a front exterior wall of said trailer;

said alcohol storage tank having an inlet formed centrally in said first circular end wall provided with a "glad hands" connector coupled to said tractor air supply line and an outlet formed centrally in said second circular end wall having a "glad hands" connector coupled to said trailer brake distribution line;

a screw on cap on said alcohol storage tank for adding alcohol to said storage tank;

a sight glass on said storage tank for monitoring the alcohol level within said tank; and a pressure gage on said tank for monitoring pressure within said tank.

* * * * *